United States Patent
Shaw et al.

(10) Patent No.: US 10,148,343 B2
(45) Date of Patent: Dec. 4, 2018

(54) DRONE BASE STATION COMPANION (71) Applicant: AT&T Intellectual Property I, L.P., Atlanta, GA (US)

(72) Inventors: Venson M. Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

(21) Appl. No.: 15/089,664

(22) Filed: Apr. 4, 2016

(65) Prior Publication Data
US 2017/0288768 A1 Oct. 5, 2017

(51) Int. Cl.
*H04W 40/00* (2009.01)
*H04B 7/185* (2006.01)
*H04W 40/22* (2009.01)
*H04B 7/26* (2006.01)
*H04W 16/26* (2009.01)

(52) U.S. Cl.
CPC ....... *H04B 7/18506* (2013.01); *H04B 7/2606* (2013.01); *H04W 16/26* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 8,989,922 B2 | 3/2015 | Jones et al. | |
| 2008/0063097 A1* | 3/2008 | Horiuchi | H04B 7/15542 375/260 |
| 2010/0291935 A1* | 11/2010 | Rudrapatna | H04B 7/155 455/450 |

(Continued)

FOREIGN PATENT DOCUMENTS

| EP | 2938117 A1 | 10/2015 |
|---|---|---|
| WO | WO 2015139733 A1 | 9/2015 |
| WO | WO 2015175055 A2 | 11/2015 |

OTHER PUBLICATIONS

Khan, F., "Coreless 5G Mobile Network," Samsung Research America, Aug. 2015, 6 pages.

(Continued)

*Primary Examiner* — Shantell L Heiber
(74) *Attorney, Agent, or Firm* — Zagorin Cave LLP (57) ABSTRACT

Use of a drone base station companion increases diversity gain in a communications system to reduce error rates and the probability of the need for a retransmission due to channel fading. An apparatus includes a drone base station companion configured as a relay between a base station in a first cell and wireless user equipment in the first cell. The drone base station companion includes a wireless receiver path configured to receive a wireless communication including data from the base station. The drone base station companion includes a wireless transmitter path configured to transmit the data to the wireless user equipment. The drone base station companion may include a second wireless receiver path configured to receive a second wireless communication including the data from the wireless user equipment. The drone base station companion may include a second wireless transmitter path configured to transmit the second data to the base station.

18 Claims, 4 Drawing Sheets

(56) References Cited

U.S. PATENT DOCUMENTS

| | | | |
|---|---|---|---|
| 2014/0126464 A1* | 5/2014 | Barrett | H04L 1/08 370/315 |
| 2015/0236778 A1 | 8/2015 | Jalali | |
| 2015/0236779 A1 | 8/2015 | Jalali | |
| 2015/0304885 A1 | 10/2015 | Jalali | |
| 2015/0327136 A1 | 11/2015 | Kim et al. | |
| 2016/0150525 A1* | 5/2016 | Xu | H04W 74/006 370/329 |

OTHER PUBLICATIONS

Kumbhar, A., et al., "A Survey on Legacy and Emerging Technologies for Public Safety Communications," Department of Electrical and Computer Engineering, Florida International University, Sep. 28, 2015, pp. 1-22.

Valcarce, A., et al., "Airborne Base Stations for Emergency and Temporary Events," Personal Satellite Services, Springer International Publishing, 2013. 12 pages.

* cited by examiner

DRONE BASE STATION COMPANION

BACKGROUND

Field of the Invention

This disclosure relates to communications technology and more particularly to providing wireless communications services to users.

Description of the Related Art

Signals propagating between a transmitter and a receiver of a mobile communications system experience a power loss proportional to the square of the distance, d, from the transmitter. The signal may travel through a direct path and an indirect, reflective path, e.g., the signal may reflect off buildings or moving vehicles. The power loss in the reflective path increases with the fourth power of the distance, d. In crowded areas, the actual loss profile may be proportional to $d^2$ for some distance and may be proportional to $d^4$ for another. In addition, different phase shifts of direct and indirect signal paths causes fluctuations in the received signal level as a function of distance. The loss in different signal paths, i.e., multi-path fading, may cause signals to arrive at the receiver with opposite phases and approximately equal amplitudes resulting in a net received signal being relatively small. Accordingly, improved techniques for communicating wireless signals are desired.

SUMMARY OF THE DISCLOSURE

In at least one embodiment, an apparatus includes a drone base station companion configured as a relay between a base station in a first cell and a wireless user equipment in the first cell. The drone base station companion includes a wireless receiver path configured to receive a wireless communication including data from the base station. The drone base station companion includes a wireless transmitter path configured to transmit the data to the wireless user equipment. The drone base station companion may further include a second wireless receiver path configured to receive a second wireless communication including second data from the wireless user equipment. The drone base station companion may further include a second wireless transmitter path configured to transmit the second data to the base station. The drone base station companion may further include a second wireless receiver path configured to receive a second wireless communication including second data from a second wireless user equipment in a second cell. The drone base station companion may further include a second wireless transmitter path configured to transmit the second data to a second base station in the second cell.

The drone base station companion may be deployed to a location proximate to an edge of the first cell and proximate to an edge of the second cell and may be configured to simultaneously relay communications between the first base station and the first wireless user equipment and communications between the second base station and the second wireless user equipment. The drone base station companion may be configured to communicate performance data to a drone base station companion controller. The apparatus may further include a drone base station companion controller configured to deploy the drone base station companion based on performance data associated with communications between the first wireless user equipment and the base station.

The wireless user equipment may include a first receiver interface configured to receive a first received signal including data from the drone base station companion. The wireless user equipment may include a second receiver interface configured to receive a second received signal including the data from the base station. The wireless user equipment may include a combiner configured to generate a combined received signal based on the first received signal and the second received signal. A signal-to-noise ratio associated with the combined received signal may be greater than a second signal-to-noise ratio associated with the second received signal. The apparatus may further include the base station. The base station may include a first receiver interface configured to receive a first received signal including the data from the drone base station companion. The base station may include a second receiver interface configured to receive a second received signal including the data from the wireless user equipment. The base station may include a combiner configured to generate a combined received signal based on the first received signal and the second received signal. The wireless receiver path and the wireless transmitter path of the drone base station companion may be compliant with different wireless standards.

In at least one embodiment, a method includes receiving a first wireless communication including data using a first wireless communications path directly between a base station and a wireless user equipment. The method includes receiving a second wireless communication including the data using an indirect wireless communications path between the base station and the wireless user equipment. The indirect wireless communications path includes a drone base station companion configured as a relay between the base station and the wireless user equipment. The method includes recovering the data based on the first wireless communication and the second wireless communication. The method may include combining signals based on the first wireless communication and the second wireless communication to generate a combined signal having an associated signal-to-noise ratio greater than a second signal-to-noise ratio associated with the second received signal. The method may include deploying the drone base station companion based on performance data associated with communication between the wireless user equipment and the base station. The method may include receiving by the drone base station companion a third wireless communication including the data. The method may include transmitting by the drone base station companion the first wireless communication including the data. The first wireless communication and the second wireless communication may be received using different wireless standards. The method may include communicating performance data to a drone base station companion controller. The method may include deploying the drone base station companion based on the performance data. The drone base station companion may be deployed to a location proximate to an edge of a first cell and proximate to an edge of a second cell.

In at least one embodiment, a wireless user equipment includes a first receiver path configured to receive a first received signal from a drone base station companion, the first received signal including data. The wireless user equipment includes a second receiver path configured to receive a second received signal from a base station, the second received signal including the data. The wireless user equipment includes a combiner configured to generate a combined received signal based on the first received signal and the second received signal. The wireless user equipment may include a first transmitter path configured to transmit a first signal to the drone base station companion, the first signal including second data. The wireless user equipment may include a second transmitter path configured to transmit a second signal to the base station, the second signal including the second data.

BRIEF DESCRIPTION OF THE DRAWINGS

The present disclosed technology may be better understood, and its numerous objects, features, and advantages made apparent to those skilled in the art by referencing the accompanying drawings.

The use of the same reference symbols in different drawings indicates similar or identical items.

DETAILED DESCRIPTION

In general, effects of fading in a wireless communication system may be reduced by adding redundancy into transmission and/or reception of a wireless signal. Individual channels experience different levels of fading and interference. Diversity techniques may use two or more communication channels with different characteristics to improve reliability of signal communications. Multiple versions of the same signal may be transmitted and/or received and jointly received or combined in the receiver. Diversity techniques may exploit multipath propagation, resulting in diversity gain. Various types of diversity may be used (e.g., space, polarization, time, etc.). Space diversity transmits a signal over several different propagation paths, e.g., antenna diversity using multiple transmitter antennas (transmit diversity) and/or multiple receiving antennas (reception diversity).

Figure 1:
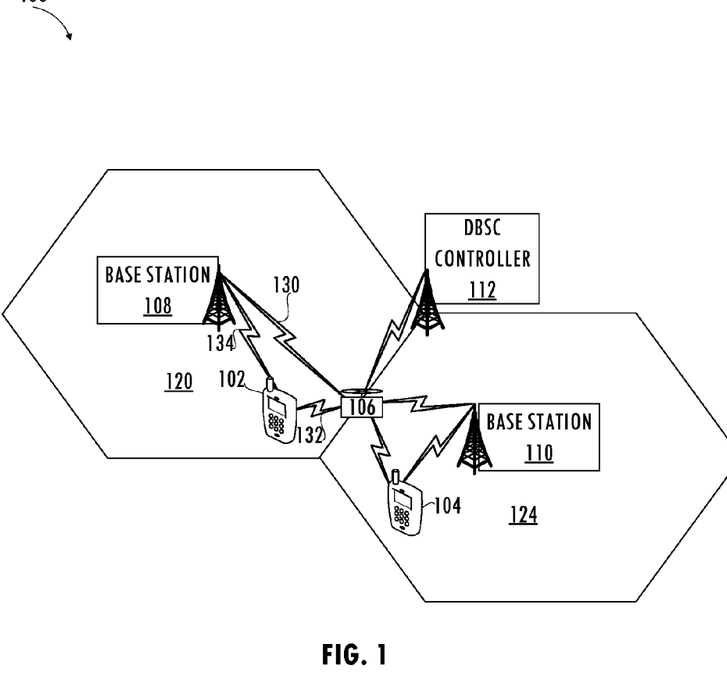
FIG. 1 illustrates a functional block diagram of an exemplary wireless communications system including a drone base station companion consistent with at least one embodiment of the disclosed technology.

Referring to FIG. 1, a diversity gain technique utilizes drone base station companion 106, which operates as a relay in a separate, indirect path between base station 108 and user equipment 102 of wireless communication system 100. The indirect path between base station 108 and user equipment 102 includes communication 130 between base station 108 and drone base station companion 106 and communication 132 between drone base station companion 106 and user equipment 102. Communication 134 is a direct path between base station 108 and user equipment 102 and includes data that is redundant to the data communicated using the indirect path.

Drone base station companion 106 is a low cost, unmanned aerial vehicle that does not require permanent ground installation on real property, but is able to provide diversity gain to communications systems experiencing substantial signal fading e.g., in metropolitan areas, during periods of high system usage. In at least one embodiment, drone base station companion 106 includes multiple transceivers that can be configured to relay uplink signals from user equipment 102 to base station 108 and downlink signals from base station 108 to user equipment 102. Each transceiver may be configured to serve as one physical uplink or downlink channel of a proximate base station or base stations. Signals relayed by the drone use indirect paths different from corresponding direct paths.

In at least one embodiment, drone base station companion 106 hovers at least tens of meters away from any base station that it serves so that associated channel fading coefficients of an indirect channel between user equipment 102 and base station 108 via drone base station companion 106 are independent from channel fading coefficients of a corresponding direct channel between user equipment 102 and base station 108. A receiver of base station 108 or a receiver of user equipment 102 may receive a combined signal including the data received jointly from the direct channel between user equipment 102 and base station 108 and the indirect channel between user equipment 102 and base station 108. The combined signal having an associated signal-to-noise ratio greater than a signal-to-noise ratio associated with the signal received using the direct channel alone.

In at least one embodiment, base station 108 separately receives signal 134 including the data using the direct channel between user equipment 102 and base station 108 and signal 130, also including the data, using the indirect channel between user equipment 102 and base station 108 via drone base station companion 106. The receiver of base station 108 combines those received signals. The resulting combined signal having an associated signal-to-noise ratio greater than a signal-to-noise ratio associated with signal 130 received using the direct channel alone. Accordingly, the additional diversity gain introduced by use of a drone base station companion reduces error rates and probability of the need for a retransmission due to channel fading.

Figure 2:
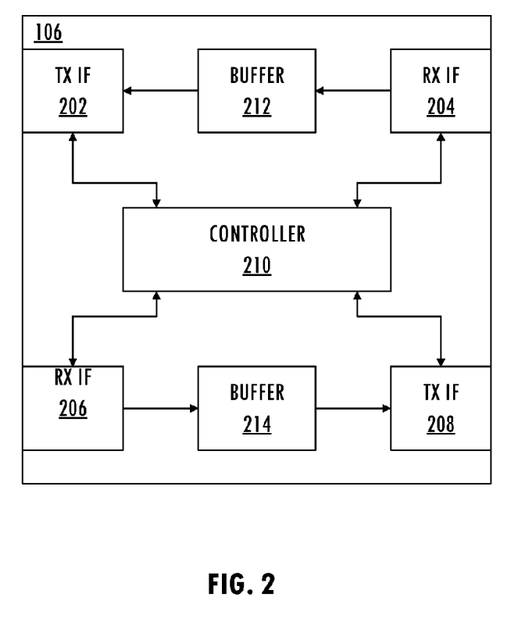
FIG. 2 illustrates a functional block diagram of an exemplary drone base station companion consistent with at least one embodiment of the disclosed technology.

Referring to FIG. 2, in at least one embodiment, drone base station companion 106 is configured as a relay that detects signals using the same communications protocol as the intended receiver. Drone base station companion 106 may temporarily queue and store signals in buffer 212 and/or amplify signals between receiver interface 204 and transmitter interface 202, but makes no change to the communications protocol of the received signal before transmitting a signal based on that received signal. Accordingly, the base station or user equipment may receive the signal from drone base station companion 106 jointly or separately with the signal communicated using the direct path.

In at least one embodiment, drone base station companion 106 is configured to change the communications protocol of the indirect communication from a communications protocol of the transmitting system element (e.g., a transmitter of user equipment 102 or a transmitter of base station 108) to a communications protocol of a redundant path of the receiving system (e.g., a receiver path of base station 108 or a receiver path of user equipment 102, respectively). Thus, additional logic may be included within controller 210, buffer 212 or buffer 214, or within receiver interface 204 and transmitter interface 202 of user equipment 102 to facilitate the protocol change. Accordingly, the base station or user equipment may receive the signal from drone base station companion 106 and the signal communicated using a direct path using separate receiver front-ends compliant with the different communications protocols. The resulting digital signals may be combined in baseband processing logic of the receiving system (e.g., user equipment 102 or base station 108).

Drone base station companion 106 may include an administration and maintenance channel wireless connection with a central management system, e.g., drone base station companion controller 112, which receives performance data from drone base station companion 106. Drone base station companion controller 112 may use that information to adjust a position of drone base station companion 106. An exemplary drone base station companion 106 includes at least one propeller (e.g., four propellers) and a battery that are used to allow drone base station companion 106 to be airborne at an altitude similar to an altitude of base station 108 or higher for multiple hours each time the battery is fully charged. Drone base station companion 106 may be configured to change location (e.g., up to a few miles) at a low speed in response to communication from drone base station companion controller 112.

Figure 3:
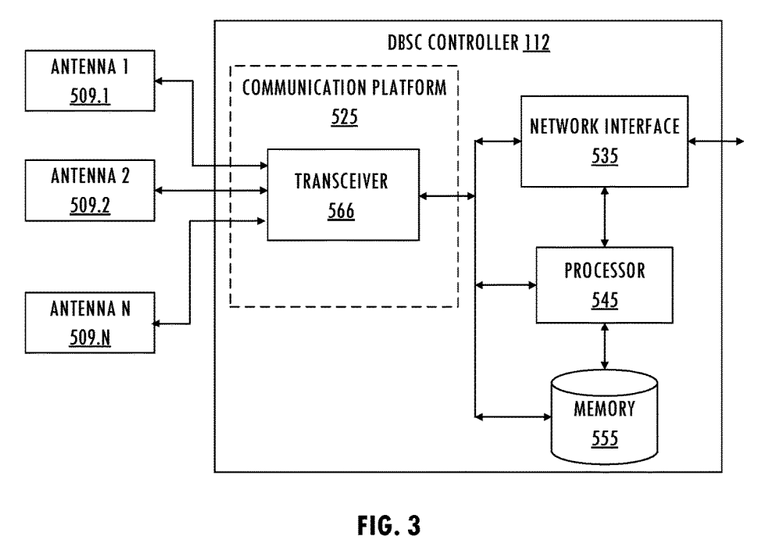
FIG. 3 illustrates a functional block diagram of an exemplary drone base station companion controller consistent with at least one embodiment of the disclosed technology.

Referring to FIG. 3, drone base station companion controller 112 controls drone base station companion 106, e.g., by deploying drone base station companion 106, adjusting the location of drone base station companion 106, or redeploying drone base station companion 106 to another location so that it is positioned where it is needed to provide a diversity path. Drone base station companion controller 112 may adjust the position of drone base station companion 106 within a particular cell or with respect to multiple cells (e.g., at an adjacent edge of cell 102 and cell 124) in order to provide an indirect path in multiple cells (e.g., an indirect path between base station 108 and wireless user equipment 102 and an indirect path between base station 110 and wireless user equipment 104) in response to load and performance data collected using drone base station companion 106. For example, drone base station companion 106 communicates a channel quality indicator to drone base station companion controller 112. The channel quality indicator may contain information indicating a suitable downlink transmission data rate, e.g., a modulation and coding scheme value based on a corresponding signal-to-noise ratio or other metric at the user equipment, or other suitable information. Drone base station controller 112 may be incorporated into a base station (e.g., base station 108 or base station 110), may be a stand alone unit, or may be incorporated into another network component.

Drone base station companion controller 112 can receive and transmit signal(s) to or from drone base station companion 106 (e.g., performance data from drone base station companion 106 and control signals to drone base station companion 106), through a set of antennas 509.1-509.N. Antennas 509.1-509.N form part of communication platform 525, which includes electronic components and associated circuitry for processing received signal(s) and for processing signals to be transmitted. Communication platform 525 may include transceiver 566 that can convert signal(s) from analog format to digital format upon reception, and from digital format to analog format for transmission.

Drone base station companion controller 112 may also include one or more processors 545 configured to confer functionality, at least partially, to substantially any electronic component in the drone base station companion controller 112, in accordance with aspects of the subject disclosure. In particular, processor 545 can facilitate implementing configuration instructions, which can include storing data in memory 555. In addition, processor 545 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 545 can manipulate antennas 509.1-509.N to facilitate beamforming or selective radiation pattern formation, which can benefit specific locations covered by drone base station companion controller 112 and exploit substantially any other advantages associated with smart-antenna technology. The one or more processors 545 may include digital signal processing capability to effectuate necessary functions associated with reception and transmission of information via antennas 509.1-509.N. The one or more processors 545 may implement a substantial portion of the processing in communication platform 525.

Memory 555 may store data structures, code instructions, and specify capabilities. Processor 545 may be coupled to the memory 555 in order to store and retrieve information necessary to operate and/or confer functionality to communication platform 525, network interface 535 (e.g., that couples drone base station companion controller 112 to core network devices such as but not limited to a network controller), and other operational components (e.g., multimode chipset(s), power supply source; not shown) that support drone base station companion controller 112. In addition, it is to be noted that the various aspects disclosed in the subject specification may also be implemented through program modules stored in a computer-readable storage medium or memory (e.g., memory 555) and executed by a processor (e.g., processor 545), or other combination(s) of hardware and software, or hardware and firmware.

Figure 4:
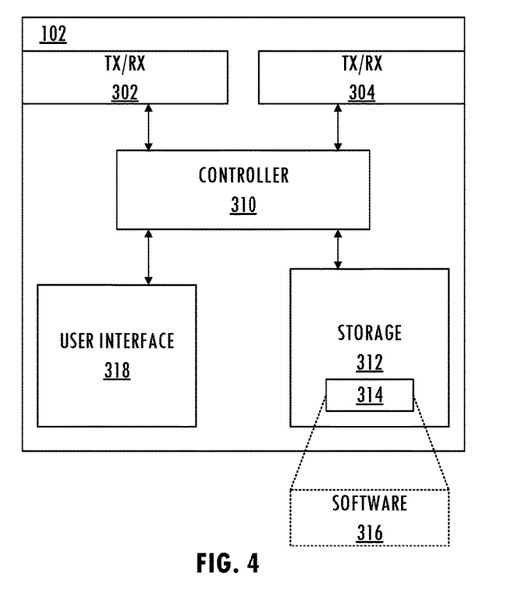
FIG. 4 illustrates a functional block diagram of an exemplary wireless user equipment consistent with at least one embodiment of the disclosed technology.

Referring to FIG. 4, the components of the exemplary wireless user equipment 102 are either generally known in the art or based on those generally known in the art, although functionally some of those components have been modified or enhanced as described herein with respect to the present disclosure. Wireless user equipment 102 may be a mobile phone, laptop, tablet, wearable device, server, or other computing system. Wireless user equipment 102 in the illustrated embodiment is shown to have capability to communicate via two radio access technologies using transmitter and receiver 302 and transmitter and receiver 304 (radio access technology A and radio access technology B, respectively) although either or both may be wireline transceivers. In an exemplary embodiment radio access technology A is a cellular radio access technology different from radio access technology B. Wireless user equipment 102 includes a controller 310, such as a processor, microcontroller or similar data processing device that executes program instructions 316 stored in locations 314 of storage 312. Typical transmitter functions, e.g., coding, mapping, and modulation, are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular radio frequency protocols and technology being employed. The receiver functions may be implemented in various combinations of analog and digital logic. In particular, the transmitter and receiver functions may use digital signal processing and controller 310 represents the necessary digital signal processing capability to implement necessary digital signal processing functions, even though one or more separate digital signal processors may be provided in wireless user equipment 102.

Storage 312 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

Controller 310 may be implemented as a single special purpose integrated circuit (e.g., ASIC) having a main or central processor unit for overall, system-level control, and separate sections dedicated to performing various specific computations, functions and other processes under the control of the central processor unit. Controller 310 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. Controller 310 may also include other circuitry or components, such as memory devices, relays, mechanical linkages, communications devices, drivers and other ancillary functionality to affect desired control and/or input/output functions.

Controller 310 may be operatively coupled with user interface 318. User interface 318 may include items known in the art, such as a display, keypad, speaker, microphone, and other user interface I/O components. In at least one embodiment, controller 310 provides functionality to achieve combining of redundant signals received using a direct communications path and an indirect communication path including a drone base station companion in embodiments using different radio access technologies. Controller 310 may also provide functionality to achieve generating redundant signals for transmission using a direct communications path and an indirect communication path including a drone base station companion in embodiments using different radio access technologies. In the illustrated embodiment the controller utilizes software functionality 316 stored in memory 314 to implement at least a portion of the drone logic necessary to achieve the correct functionality as described herein. While software may be used to implement aspects of control in user equipment, some aspects utilize at least some hardware circuits and the particular segmentation between software and hardware control is implementation specific and thus can vary in different embodiments.

Figure 5:
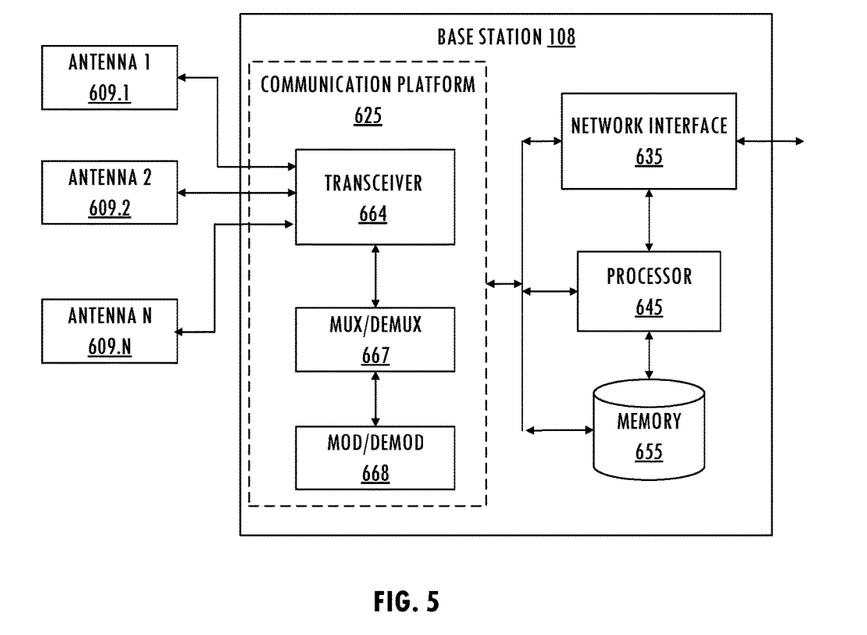
FIG. 5 illustrates a functional block diagram of an exemplary base station consistent with at least one embodiment of the disclosed technology.

FIG. 5, illustrates a high level block diagram of an exemplary embodiment 108 of a base station that may be used to implement the techniques described herein. Base station 108 may receive and transmit signal(s) (e.g., data traffic and control signals) to and from user equipment, through a set of antennas 609.1-609.N. Antennas 609.1-609.N form part of communication platform 625, which includes electronic components and associated circuitry for processing received signal(s) (data and control) and for processing signals (data and control) to be transmitted. Communication platform 625 may include a transceiver 664 that may convert signal(s) from analog format to digital format upon reception, and from digital format to analog format for transmission. In addition, transceiver 664 may divide a single data stream into multiple, parallel data streams, or perform the reciprocal operation. Coupled to transceiver 664 is a multiplexer/demultiplexer 667 that facilitates manipulation of signals in the time and/or frequency domain. Multiplexer/demultiplexer 667 may multiplex information (data/traffic and control/signaling) according to various multiplexing schemes such as time division multiplexing (TDM), frequency division multiplexing (FDM), orthogonal frequency division multiplexing (OFDM), filtered OFDM, etc. In addition, multiplexer/demultiplexer 667 can scramble and spread information (e.g., codes) according to substantially any code known in the art. A modulator/demodulator 668 is also a part of communication platform 625, and can modulate information according to multiple modulation techniques, e.g., M-ary quadrature amplitude modulation (QAM), with M a positive integer, and phase-shift keying (PSK).

Base station 108 also includes one or more processors 645 configured to confer functionality, at least partially, to substantially any electronic component in the base station 108, in accordance with aspects of the subject disclosure. In particular, processor 645 can facilitate implementing configuration instructions, which can include storing data in memory 655. In addition, processor 645 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 645 can manipulate antennas 609.1-609.N to facilitate beamforming or selective radiation pattern formation, which can benefit specific locations covered by the base station 108, and exploit substantially any other advantages associated with smart-antenna technology. Thus, the one or more processors 645 may include digital signal processing capability to effectuate necessary functions associated with reception and transmission of information via antennas 609.1-609.N. Thus, the one or more processors 645 may implement a significant portion of the processing in communication platform 625.

Memory 655 may store data structures, code instructions, and specify capabilities, code sequences for scrambling, spreading and pilot transmission, floor plan configuration, access point deployment and frequency plans, etc. Processor 645 may be coupled to the memory 655 in order to store and retrieve information necessary to operate and/or confer functionality to communication platform 625, network interface 635 (e.g., that coupled the access point to core network devices such as but not limited to a network controller), and other operational components (e.g., multimode chipset(s), power supply source; not shown) that support base station 108. Base station 108 may further include a network interface 635 for communication via wired technologies. In addition, it is to be noted that the various aspects disclosed in the subject specification can also be implemented through using program modules stored in a computer-readable storage medium or memory (e.g., memory 655) and executed by a processor (e.g., processor 645), or using other combination(s) of hardware and software, or hardware and firmware.

Figure 6:
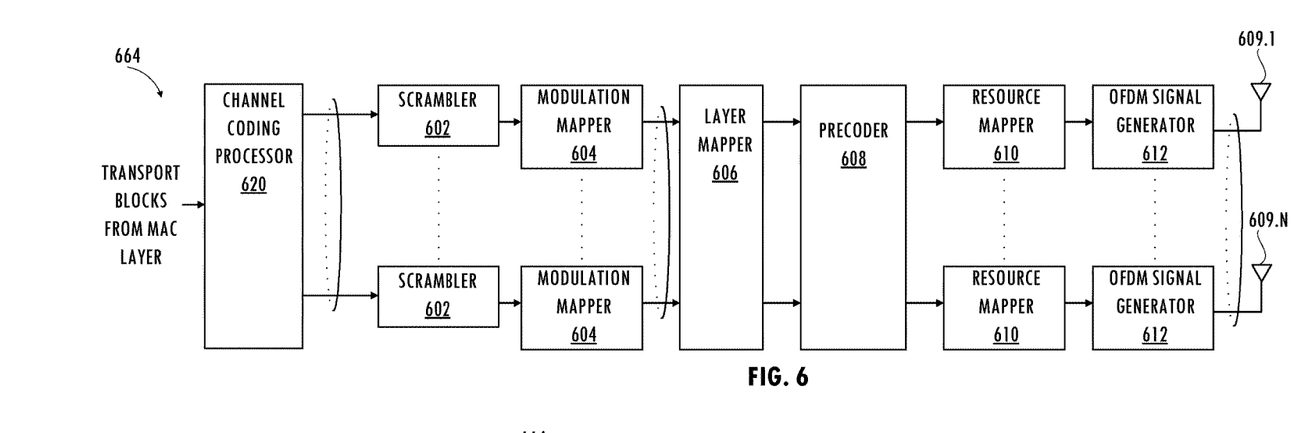
FIG. 6 illustrates a functional block diagram of an exemplary transmitter path consistent with at least one embodiment of the disclosed technology.
Figure 7:
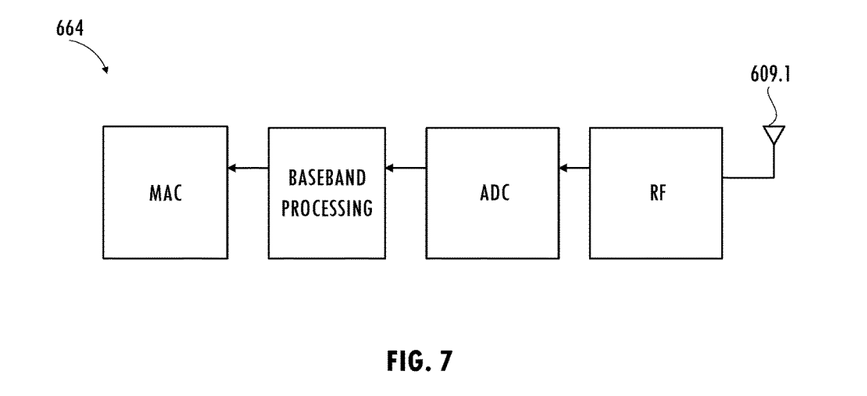
FIG. 7 illustrates a functional block diagram of an exemplary receiver path consistent with at least one embodiment of the disclosed technology.

Referring to FIG. 6, an exemplary transceiver 664, includes a transmitter path including channel coding processor 620, scrambler(s) 602, modulation mappers 604, layer mappers 606, precoder 608, resource mappers 610, and OFDM signal generators 612, which generate radio frequency signals for transmission by one or more of antennas 609.1 ... 609.N. Transceiver 566, transceiver 302, transceiver 304, transmitter 202, and transmitter 208 each include a transmitter path similar to a single transmitter path of transceiver 664. FIG. 7 illustrates exemplary receiver portion of transceiver 664, transceiver 566, transceiver 302, transceiver 304, receiver 204, and receiver 206 for jointly receiving the direct communications and indirect communication using drone base station companion 106. The combined signal is associated with a signal-to-noise ratio greater than a signal-to-noise ratio associated with the signal received using the direct channel alone.

Figure 8:
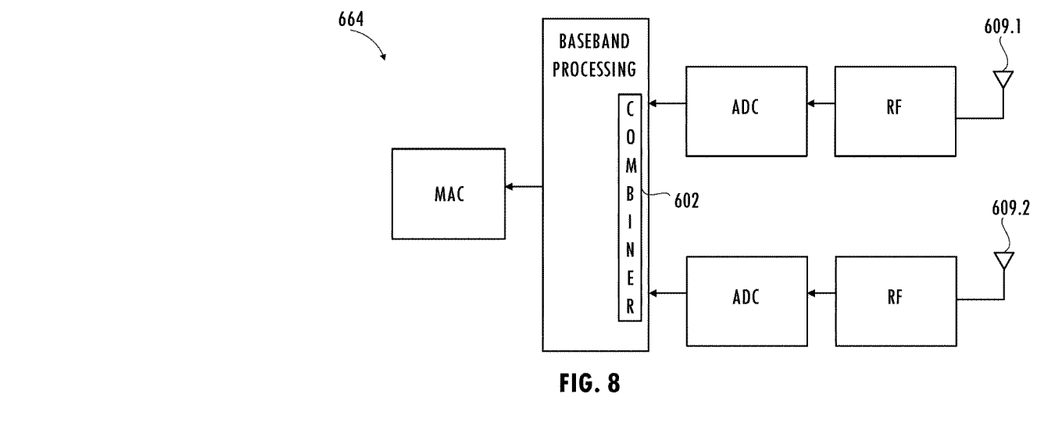
FIG. 8 illustrates a functional block diagram of an exemplary receiver path consistent with at least one embodiment of the disclosed technology.

FIG. 8 illustrates exemplary receiver portion of transceiver 664, transceiver 566, transceiver 302, transceiver 304, or the combination of receiver 204 and receiver 206, for receiving a signal including data using the direct channel between user equipment 102 and base station 108 using antenna 609.1 separate from a signal including the data using the indirect channel between user equipment 102 and base station 108 via drone base station companion 106 using antenna 609.2. Combiner 602 combines signals based on the received signals using any suitable diversity combining technique (e.g., timing combining, switched combining, selection combining). The resulting combined signal has an associated signal-to-noise ratio greater than a signal-to-noise ratio associated with the signal received using the direct channel alone. Accordingly, the additional diversity gain introduced by the system including a drone base station companion may reduce error rates and probability of the need for a retransmission due to channel fading. Note that exemplary transceiver portions of FIGS. 6, 7, and 8 may be included in transceiver 302 or transceiver 304 of user equipment 102 of FIG. 4.

As referred to herein, memory and other information storage component relevant to operation and functionality of a component, refer to any form of memory that can store information and be read by computers or processors. Memory may be volatile memory or nonvolatile memory, or both. Nonvolatile memory can include read only memory (ROM), programmable ROM (PROM), electrically programmable ROM (EPROM), electrically erasable ROM (EEPROM), or flash memory. In addition non-volatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium. The description set forth herein is illustrative, and is not intended to limit the scope of the disclosure as set forth in the following claims. Variations and modifications of the embodiments disclosed herein, may be made based on the description set forth herein, without departing from the scope and spirit of the disclosure as set forth in the following claims.

What is claimed is:

1. An apparatus comprising:
a base station comprising:
a first receiver interface configured to receive a first received signal including data from a drone base station companion configured as a relay between the base station in a first cell and a wireless user equipment in the first cell;
a second receiver interface configured to receive a second received signal including the data from the wireless user equipment; and
a combiner configured to generate a combined received signal based on the first received signal and the second received signal,
wherein a signal-to-noise ratio associated with the combined received signal is greater than a second signal-to-noise ratio associated with the second received signal.

2. The apparatus, as recited in claim 1, further comprising:
the drone base station companion comprising:
a wireless receiver path configured to receive a wireless communication including the data from the wireless user equipment; and
a wireless transmitter path configured to transmit the data to the base station.

3. The apparatus, as recited in claim 2, wherein the drone base station companion further comprises:
a second wireless receiver path configured to receive a second wireless communication including second data from the base station; and
a second wireless transmitter path configured to transmit the second data to the wireless user equipment.

4. The apparatus, as recited in claim 3, wherein the wireless user equipment comprises:
a third receiver interface configured to receive a third received signal including the second data from the drone base station companion;
a fourth receiver interface configured to receive a fourth received signal including the second data from the base station; and
a second combiner configured to generate a second combined received signal based on the third received signal and the fourth received signal.

5. The apparatus, as recited in claim 4, wherein a third signal-to-noise ratio associated with the combined received signal is greater than a fourth signal-to-noise ratio associated with the second received signal.

6. The apparatus, as recited in claim 2, wherein the drone base station companion further comprises:
a second wireless receiver path configured to receive a second wireless communication including second data from a second wireless user equipment in a second cell; and
a second wireless transmitter path configured to transmit the second data to a second base station in the second cell.

7. The apparatus, as recited in claim 6, wherein the drone base station companion is deployed to a location proximate to an edge of the first cell and proximate to a second edge of the second cell and is configured to simultaneously relay communications between the base station and the wireless user equipment and communication between the second base station and the second wireless user equipment.

8. The apparatus, as recited in claim 2, wherein the drone base station companion is configured to communicate performance data to a drone base station companion controller.

9. The apparatus, as recited in claim 2, further comprising:
a drone base station companion controller configured to deploy the drone base station companion based on performance data associated with communications between the wireless user equipment and the base station.

10. The apparatus, as recited in claim 2, wherein the wireless receiver path and the wireless transmitter path are compliant with different wireless standards.

11. A method comprising:
receiving a first wireless communication including data using a first wireless communications path directly between a base station and a wireless user equipment; and
receiving a second wireless communication including the data using an indirect wireless communications path between the base station and the wireless user equipment, the indirect wireless communications path including a drone base station companion configured as a relay between the base station and the wireless user equipment;
recovering the data based on the first wireless communication and the second wireless communication; and
combining signals based on the first wireless communication and the second wireless communication to generate a combined signal having an associated signal-to-noise ratio greater than a second signal-to-noise ratio associated with the second wireless communication.

12. The method, as recited in claim 11, further comprising:
deploying the drone base station companion based on performance data associated with communications between the wireless user equipment and the base station.

13. The method, as recited in claim 11, further comprising:
receiving, by the drone base station companion, a third wireless communication including the data; and
transmitting by the drone base station companion the first wireless communication including the data.

14. The method, as recited in claim 11, wherein the first wireless communication and the second wireless communication are received using different wireless standards.

15. The method, as recited in claim 11, further comprising:
communicating performance data to a drone base station companion controller; and
deploying the drone base station companion based on the performance data.

16. The method, as recited in claim 11, wherein the drone base station companion is deployed to a location proximate to an edge of a first cell and proximate to a second edge of a second cell.

17. A wireless user equipment comprising:
a first receiver path configured to receive a first received signal from a drone base station companion, the first received signal including data;
a second receiver path configured to receive a second received signal from a base station, the second received signal including the data; and
a combiner configured to generate a combined received signal based on the first received signal and the second received signal,
wherein a signal-to-noise ratio associated with the combined received signal is greater than a second signal-to-noise ratio associated with the second received signal.

18. The wireless user equipment, as recited in claim 17, further comprising:
a first transmitter path configured to transmit a first signal to the drone base station companion, the first signal including second data; and
a second transmitter path configured to transmit a second signal to the base station, the second signal including the second data.

* * * * *